US012587576B2

(12) United States Patent　　　　　(10) Patent No.: US 12,587,576 B2

Agrawal et al.　　　　　　　　　　　(45) Date of Patent:　　Mar. 24, 2026

(54) MODULATION-BASED CALL EXIT MANAGEMENT

(71) Applicant: Motorola Mobility LLC, Chicago, IL (US)

(72) Inventors: Amit Kumar Agrawal, Bangalore (IN); Satyabrata Rout, Bangalore (IN); Himanshu Chug, Bangalore (IN)

(73) Assignee: Motorola Mobility LLC, Chicago, IL (US)

( * ) Notice: Subject to any disclaimer, the term of this patent is extended or adjusted under 35 U.S.C. 154(b) by 188 days.

(21) Appl. No.: 18/448,336

(22) Filed: Aug. 11, 2023

(65) Prior Publication Data

US 2025/0055888 A1　　Feb. 13, 2025

(51) Int. Cl.

| | |
|---|---|
| *H04L 65/1093* | (2022.01) |
| *G06F 3/01* | (2006.01) |
| *G06F 3/16* | (2006.01) |
| *G10L 15/22* | (2006.01) |
| *G10L 21/013* | (2013.01) |

(Continued)

(52) U.S. Cl.

CPC .......... H04L 65/1093 (2013.01); G06F 3/017 (2013.01); G06F 3/165 (2013.01); G10L 15/22 (2013.01); G10L 21/013 (2013.01); H04L 12/1831 (2013.01); H04L 65/1089 (2013.01); H04L 65/613 (2022.05); H04N 5/2222 (2013.01); *G10L 2021/0135* (2013.01)

(58) Field of Classification Search

CPC ............... H04L 65/1093; H04L 65/613; H04L 12/1831; H04L 65/1089; G06F 3/017; G06F 3/165; G10L 15/22; G10L 21/013; H04N 5/2222

See application file for complete search history.

(56) References Cited

U.S. PATENT DOCUMENTS

| | | | | |
|---|---|---|---|---|
| 7,203,648 | B1 * | 4/2007 | Ostermann | ............. G10L 21/10 |
| | | | | 704/275 |
| 8,363,804 | B1 * | 1/2013 | Adams | .............. H04M 3/53383 |
| | | | | 379/373.02 |

(Continued)

OTHER PUBLICATIONS

"Voicemod", Voicemod S.L [retrieved Jun. 27, 2023]. Retrieved from the Internet <https://www.voicemod.net/developers/>., 7 Pages.

(Continued)

*Primary Examiner* — Olisa Anwah

(74) *Attorney, Agent, or Firm* — FIG. 1 Patents

(57) ABSTRACT

In aspects of modulation-based call exit management, a media device detects that a user desires to exit a conference call and determines whether a video feed of the conference call is active or inactive. Based on the video feed being active, the media device applies at least one of modulation or a depth effect to the pre-recorded audio message to generate a modified pre-recorded audio message. Based on the video feed being inactive, the media device records an audio message of the user reading the contextual transcript during the conference call to generate a recorded audio message and applies at least one of the modulation or the depth effect to the recorded audio message to generate a (Continued)

╭─ 500

┌─────────────────────────────┐
│ Determine a user is on a conference │
│ call with an active video feed │
│ 502 │
└─────────────────────────────┘
↓
┌─────────────────────────────┐
│ Determine the user wants to exit │
│ gracefully from the conference call │
│ 504 │
└─────────────────────────────┘
↓
┌─────────────────────────────┐
│ Prompt the user to select a pre-recorded │
│ modulated voice audio message │
│ 506 │
└─────────────────────────────┘
↓
┌─────────────────────────────┐
│ Send the depth-enhanced │
│ modulated audio to a speaker │
│ 508 │
└─────────────────────────────┘
↓
┌─────────────────────────────┐
│ Prompt the user to look in an indicated direction │
│ in relation to the pre-recorded modulated voice │
│ audio message being played on the speaker │
│ 510 │
└─────────────────────────────┘ modified recorded audio message. The media device provides the modified pre-recorded audio message or the modified recorded audio message to a speaker that emits the provided audio message.

20 Claims, 6 Drawing Sheets

(51) Int. Cl.
| | |
|---|---|
| *H04L 12/18* | (2006.01) |
| *H04L 65/1089* | (2022.01) |
| *H04L 65/613* | (2022.01) |
| *H04N 5/222* | (2006.01) |

(56) References Cited

U.S. PATENT DOCUMENTS

| | | | |
|---|---|---|---|
| 9,072,478 B1 | 7/2015 | Feerst | |
| 9,072,487 B2 | 7/2015 | Hebrard et al. | |
| 9,325,939 B2* | 4/2016 | Schultz | H04L 65/1083 |
| 9,860,200 B1 | 1/2018 | Braun et al. | |
| 10,536,288 B1 | 1/2020 | Leblang et al. | |
| 10,574,822 B1 | 2/2020 | Sheshaiahgari et al. | |
| 11,930,052 B1* | 3/2024 | Rensburg | H04L 65/1089 |
| 2002/0023331 A1 | 2/2002 | Moore | |
| 2002/0123331 A1 | 9/2002 | Lehaff et al. | |
| 2004/0138879 A1* | 7/2004 | Kim | G10L 21/003 |
| | | | 704/219 |
| 2005/0208931 A1* | 9/2005 | Hoffman | H04M 1/7385 |
| | | | 455/417 |
| 2009/0220066 A1* | 9/2009 | Shaffer | H04M 3/56 |
| | | | 379/204.01 |
| 2012/0203538 A1* | 8/2012 | Tamosevicius | H04L 65/1104 |
| | | | 379/202.01 |
| 2014/0369483 A1 | 12/2014 | Lovitt et al. | |
| 2017/0352361 A1* | 12/2017 | Thörn | G11B 27/031 |
| 2018/0129295 A1 | 5/2018 | Episkopos et al. | |
| 2018/0338040 A1 | 11/2018 | Carty et al. | |
| 2018/0373488 A1 | 12/2018 | Chisu et al. | |
| 2019/0057698 A1 | 2/2019 | Raanani et al. | |
| 2019/0287513 A1 | 9/2019 | Alameh et al. | |
| 2022/0189474 A1 | 6/2022 | Sharifi et al. | |
| 2022/0374136 A1 | 11/2022 | Chang et al. | |
| 2022/0374190 A1 | 11/2022 | Rothera et al. | |
| 2023/0216990 A1 | 7/2023 | Fang et al. | |
| 2023/0259719 A1 | 8/2023 | Barry et al. | |
| 2023/0267422 A1 | 8/2023 | Herman et al. | |
| 2023/0289130 A1* | 9/2023 | Dhoot | H04N 7/142 |
| 2023/0308538 A1 | 9/2023 | Caro et al. | |
| 2023/0359315 A1 | 11/2023 | Karunamuni et al. | |
| 2024/0029725 A1 | 1/2024 | Fryer-mcculloch et al. | |
| 2024/0179194 A1* | 5/2024 | Jaiswal | H04L 65/403 |
| 2024/0340321 A1* | 10/2024 | Srinivasaraghavan | |
| | | | H04L 12/1831 |
| 2025/0046331 A1* | 2/2025 | Hans | G06F 3/0484 |
| 2025/0055941 A1* | 2/2025 | Agrawal | H04W 4/16 |
| 2025/0078841 A1 | 3/2025 | Wu et al. | |
| 2025/0255678 A1 | 8/2025 | Roh et al. | |

OTHER PUBLICATIONS

"Non-Final Office Action", U.S. Appl. No. 18/448,358, filed Aug. 27, 2025, 18 pages.

* cited by examiner

200A

Exit Sensor(s) 122

Gesture Sensor
202

Communication
Sensor
204

200B

Audio Content
Controller 124

Audio Recorder
206

Modulation Engine
208

Depth Effect Engine
210

Speaker
212

Speaker
214

300

Detect that a user desires
to exit a conference call
302

Determine whether a video feed
of the conference call is active
304

Display a prompt to generate
a modified audio message
306

Generate the modified audio message
based on input from the user
308

Provide the modified audio message to an external
speaker that emits the modified audio message
310

400

Determine a user is on
an audio conference call
402

Determine the user wants to exit
gracefully from the conference call
404

Prompt the user to accept a contextual transcript
for exiting the conference call gracefully
406

Record the user reading the
contextual transcript out loud
408

Apply voice modulation and depth
effect to the recorded audio
410

MODULATION-BASED CALL EXIT MANAGEMENT

BACKGROUND

The video conferencing market is a growing market accelerated largely due to the global pandemic. The growth of video conferencing in general is occurring due to the increase in the proliferation of mobile devices. Mobile devices enable participants to join a video conference from almost anywhere in the world. However, sometimes a conference call may run longer than needed for the purpose of the call. At times, a point in the conversation may be reached when everyone on the call knows it is time to wrap up the call, but for one or more reasons, the discussion keeps going. In some cases, one or more participants on the call may show no signs of slowing down while one or more other participants are growing weary of the conversation. Currently, communication applications do not provide a way for participants to exit a call gracefully.

BRIEF DESCRIPTION OF THE DRAWINGS

Implementations of the techniques for modulation-based call exit management are described with reference to the following Figures. The same numbers may be used throughout to reference like features and components shown in the Figures.

DETAILED DESCRIPTION

Figure 1:
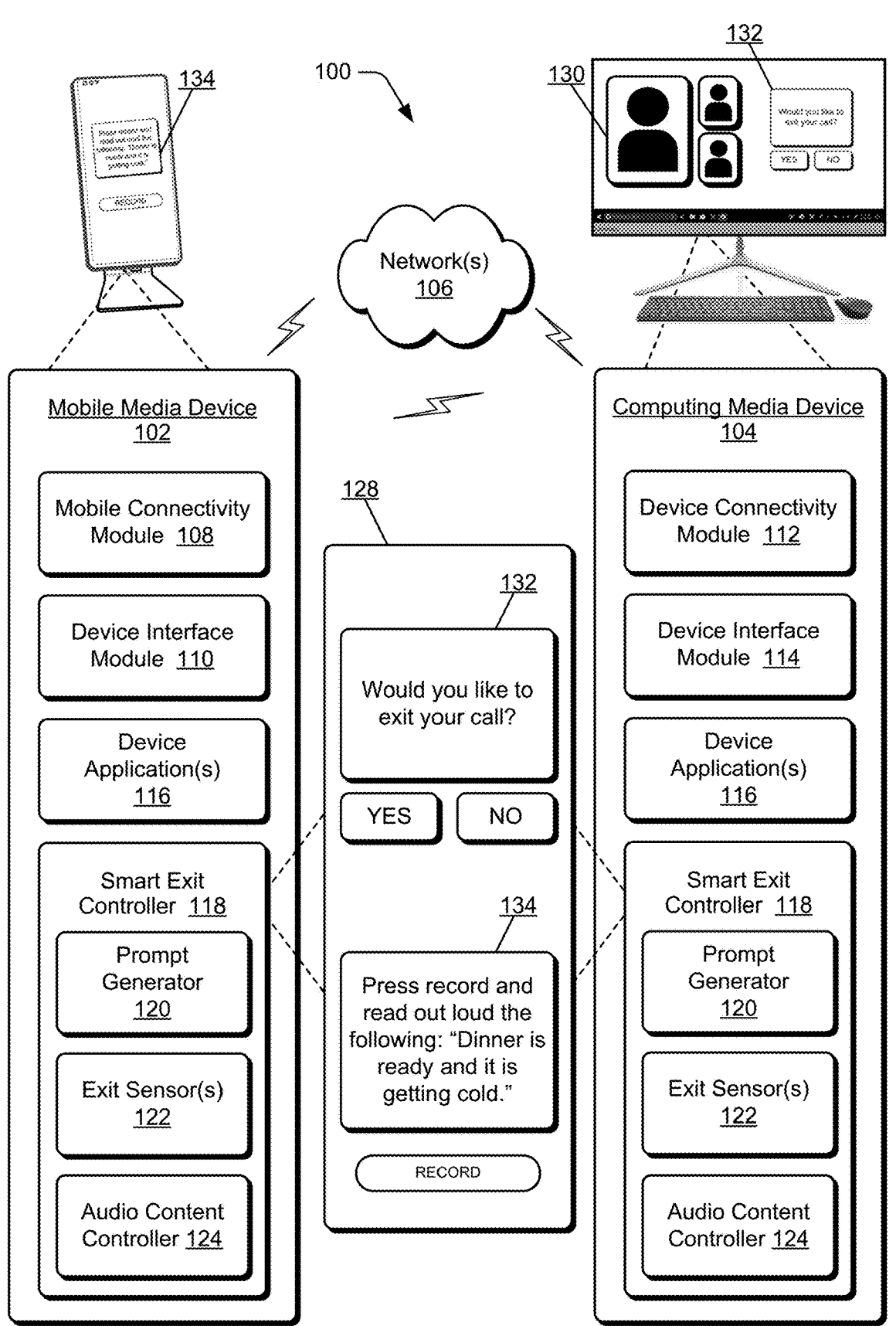
FIG. 1 illustrates an example system for modulation-based call exit management in accordance with one or more implementations as described herein.

Implementations of the techniques for modulation-based call exit management may be implemented as described herein. A media device such as any type of a wireless device, mobile device, mobile phone, flip phone, client device, companion device, paired device, display device, tablet, computing, communication, entertainment, gaming, media playback, wired speaker, wireless speaker, and/or any other type of computing and/or electronic device, or a system of any combination of such devices, may be configured to perform techniques for modulation-based call exit management as described herein. In some cases, at least one media device implements an instantiation of a smart exit controller, enabling a user to exit conference calls gracefully.

Generally, a user may utilize at least one media device to participate in a conference call. At some point, the user may determine that the conference call has served its purpose or the user simply desires to exit the call. However, the conversation may continue beyond this point because the participants do not want to appear rude for ending the call, or a participant on the call may be going strong while the user is growing weary of the conversation. The smart call exit functionality techniques for modulation-based call exit management remedies these situations.

In aspects of the described techniques, a smart exit controller implements smart call exit functionality to enable a user to exit conference calls gracefully. In some examples, the smart call exit functionality is performed via at least one media device that implements an instantiation of a smart exit controller. Audio content may be captured by the at least one media device.

In implementations, the smart exit controller can determine that a conference call is initiated on a media device, or any time during the call, determine that a user is engaging in the conference call on a media device. In some cases, the smart exit controller may determine that the length of a conference call has exceeded a threshold time period. The conference call may include an audio-only call, an audio with video call, and/or a mix of audio-only and audio with video. In some cases, the smart exit controller can determine that the user is engaged in the conference call and that the conference call satisfies a threshold number of participants (e.g., 2 or more participants, etc.). In implementations, the smart exit controller implements the smart call exit functionality techniques based on the determination that the user is engaged in the conference call. In some cases, the smart exit controller can implement the smart call exit functionality techniques based on the determination that the conference call satisfies a threshold number of participants.

While features and concepts of the described techniques for modulation-based call exit management may be implemented in any number of different media devices, systems, environments, and/or configurations, implementations of the techniques for modulation-based call exit management are described in the context of the following example devices, systems, and methods.

FIG. 1 illustrates an example system 100 for modulation-based call exit management, as described herein. The system 100 includes one or more media devices, such as a mobile media device 102 and/or a computing media device 104. Examples of media devices may include at least one of any type of a wireless device, mobile device, mobile phone, flip phone, client device, companion device, paired device, display device, tablet, computing device, communication device, entertainment device, gaming device, media playback device, wired speaker, wireless speaker, any other type of computing and/or electronic device, and/or a system of any combination of such devices.

Examples of mobile media device 102 may include at least one of a smartphone, mobile phone, or any other type of wireless device. The mobile media device 102 and/or the computing media device 104 may be implemented with various components, such as a processor system and memory, as well as any number and combination of different components as further described with reference to the example device shown in FIG. 6. In implementations, the mobile media device 102 includes various radios for wireless communication with other devices. For example, the mobile media device 102 may include a BLUETOOTH® (BT) and/or BLUETOOTH® Low Energy (BLE) transceiver and/or a near field communication (NFC) transceiver. The mobile media device 102 may also include a WI-FI® radio, a global positioning satellite (GPS) radio, and/or any available type of device communication interface.

Additionally, or alternatively, the system 100 may include a computing media device 104, such as any type of computer, laptop device, desktop computer, tablet, wireless device, smart device, media device, display device, smart TV, or any other type of presentation device. Similar to the mobile media device 102, the computing media device 104 may be implemented with various components, such as a processor system and memory, as well as any number and combination of the different components as further described with reference to the example device shown in FIG. 6. In implementations, the mobile media device 102 may be communicatively linked, either by a wired or wireless connection, to the computing media device 104. For example, the mobile media device 102 and the computing media device 104 may be communicatively linked via a communication network 106 and/or via direct inter-device connectivity, e.g., via direct wireless and/or wired connectivity between the mobile media device 102 and the computing media device 104.

Any of the devices, applications, modules, servers, and/or services described herein may communicate via the communication network 106, such as for data communication between the mobile media device 102 and the computing media device 104. The communication network 106 may include a wired and/or a wireless network. The communication network 106 may be implemented using any type of network topology and/or communication protocol, and may be represented or otherwise implemented as a combination of two or more networks, to include IP-based networks, cellular networks, and/or the Internet. The communication network 106 may include mobile operator networks that are managed by a mobile network operator and/or other network operators, such as a communication service provider, mobile phone provider, and/or Internet service provider.

The mobile media device 102 includes various functionality that enables the mobile device to implement different aspects of modulation-based call exit management, as described herein. In this example, the mobile media device 102 includes a mobile connectivity module 108 and a device interface module 110. The mobile connectivity module 108 represents functionality (e.g., logic and/or hardware) enabling the mobile media device 102 to interconnect with other devices and/or networks, such as the computing media device 104 and the communication network 106. For example, the mobile connectivity module 108 enables wireless and/or wired connectivity of the mobile media device 102. The device interface module 110 represents functionality enabling the mobile media device 102 to interface with other devices. As further detailed below, the device interface module 110 enables the mobile media device 102 to establish wireless and/or wired data communication with other devices, such as the computing media device 104 or similar presentation device. The mobile connectivity module 108 and the device interface module 110 may be implemented as computer instructions stored on computer-readable storage media and may be executed by a processor system of the device. Alternatively, or in addition, the mobile connectivity module 108 and the device interface module 110 may be implemented at least partially in hardware of the device.

Similarly, the computing media device 104 includes various functionality that enables the computing device to implement different aspects of modulation-based call exit management, as described herein. In this example, the computing media device 104 includes a device connectivity module 112 and a device interface module 114. The device connectivity module 112 represents functionality (e.g., logic and/or hardware) enabling the computing media device 104 to interconnect with other devices and/or networks, such as the mobile media device 102 and the communication network 106. For example, the device connectivity module 112 enables wireless and/or wired connectivity of the computing media device 104. The device interface module 114 represents functionality enabling the computing media device 104 to interface with other devices. As further detailed below, the device interface module 114 enables the computing media device 104 to establish wireless and/or wired data communication with other devices, such as the mobile media device 102 or similar devices. The device connectivity module 112 and the device interface module 114 may be implemented as computer instructions stored on computer-readable storage media and may be executed by a processor system of the respective device. Alternatively, or in addition, the device connectivity module 112 and the device interface module 114 may be implemented at least partially in hardware of the respective device.

A connectivity session may be established between the mobile media device 102 and the computing media device 104 that enables the mobile media device 102 to send output content to and/or receive output content from the computing media device 104. In one or more implementations, the connectivity session is established via intercommunication between the device interface module 110 of the mobile media device 102 and the device interface module 114 of the computing media device 104. The output content may be any type of digital video, images, audio, application interfaces, etc. In one or more implementations, the computing media device 104 can output the output content at the device.

The mobile media device 102 can communicate any of various types of content to the computing media device 104, and vice versa. In implementations, the mobile media device 102 outputs to the computing media device 104 content that is being displayed on a display of the mobile wireless device (e.g., also referred to as a mirror mode). In this example, the computing media device 104 displays the same content as the mobile media device 102, but as a larger size display on the computing device. Alternatively, or in addition, the mobile media device 102 can output to the computing media device 104 content from an application program or operating system without displaying the content on the display of the mobile wireless device. For example, a media application may receive content as a movie from a remote server via the communication network 106 and provide that content to the computing media device 104 for display, without displaying or otherwise presenting the content at the mobile wireless device.

The mobile media device 102 and/or the computing media device 104 can include and implement device applications 116, such as any type of messaging application, email application, video communication application, cellular communication application, music/audio application, gaming application, media application, social platform applications, and/or any other of the many possible types of device applications. Many of the device applications 116 have an associated application user interface that is generated and displayed for user interaction and viewing, such as on a display screen of the mobile media device 102 and/or on a display of the computing media device 104. Generally, an application user interface, or any other type of video, image, graphic, and the like is digital image content that is displayable on the display screen of the mobile media device 102 and/or on the display of the computing media device 104.

In the example system 100 for modulation-based call exit management, the mobile media device 102 and the computing media device 104 are media devices that incorporate smart call exit functionality. At least one media device implements an instantiation of a smart exit controller 118. In the illustrated example, each media device implements an instantiation of a smart exit controller 118 (e.g., as a device application 116). The smart exit controller 118 represents functionality (e.g., logic, software, and/or hardware)

enabling implementation of described techniques for modulation-based call exit management. The smart exit controller 118 can be implemented as computer instructions stored on computer-readable storage media and can be executed by a processor system of the mobile media device 102 and/or of the computing media device 104. Alternatively or in addition, the smart exit controller 118 can be implemented at least partially in hardware of a device.

In one or more implementations, the smart exit controller 118 may include independent processing, memory, and/or logic components functioning as a computing and/or electronic device integrated with the mobile media device 102 and/or with the computing media device 104. Alternatively or in addition, the smart exit controller 118 can be implemented in software, in hardware, or as a combination of software and hardware components. In this example, the smart exit controller 118 is implemented as a software application or module, such as executable software instructions (e.g., computer-executable instructions) that are executable with a processor system of the mobile media device 102 and/or the computing media device 104 to implement the techniques and features described herein. As a software application or module, the smart exit controller 118 can be stored on computer-readable storage memory (e.g., memory of a device), or in any other suitable memory device or electronic data storage implemented with the module. Alternatively or in addition, the smart exit controller 118 may be implemented in firmware and/or at least partially in computer hardware. For example, at least part of the smart exit controller 118 may be executable by a computer processor, and/or at least part of the content manager may be implemented in logic circuitry.

As shown, the example smart exit controller 118 may include a prompt generator 120, one or more exit sensors 122, and an audio content controller 124. In the illustrated example, the smart exit controller 118 may determine that a conference call 130 is initiated on a media device (e.g., initiated on the mobile media device 102 or initiated on the computing media device 104). In some cases, the smart exit controller 118 may determine at any time during the conference call 130 that a call is in progress on a media device. In some cases, the smart exit controller 118 can determine that the length of the conference call 130 has exceeded a threshold time period. The conference call 130 may include an audio-only call, an audio with video call, and/or a mix of audio-only and audio with video. In some cases, the smart exit controller 118 can determine that the user is engaged in the conference call 130 and that the conference call 130 satisfies a threshold number of participants (e.g., 2 or more participants, etc.). In implementations, the smart exit controller 118 may implement smart call exit functionality techniques based on the determination that the user is engaged in the conference call 130. In some cases, the smart exit controller 118 may implement the smart call exit functionality techniques based on the determination that the conference call 130 satisfies a threshold number of participants.

In the illustrated example, the smart exit controller 118 may determine that a user wants to exit the call, but wants to do so gracefully and politely without coming across as rude or abruptly disconnecting. In some cases, the smart exit controller 118 can determine (e.g., via one or more exit sensors 122) that the user wants to exit the call based on visual cues (e.g., gestures of the user), conversational cues (e.g., words or phrases spoken by the user), and/or textual cues (e.g., words or phrases written by the user) that are detected by exit sensor 122.

In some examples, the smart exit controller 118 may include a user interface. In some cases, the smart exit controller 118 may determine that the user wants to exit the call based on the user actuating a button of the user interface provided by a prompt generator 120. As shown, the prompt generator 120 may generate one or more prompts. Example prompts 128 generated by the prompt generator 120 may include a confirmation prompt 132 to confirm that the user wants to exit the call and a record prompt 134 to record the user reading out loud a contextual transcript.

When the smart exit controller 118 determines the user wishes to drop the call gracefully, the smart exit controller 118 may determine whether a video feed of the call is active (e.g., whether video of the user is on or off during a call or at the time the determination is made). When the video feed is active, the conference call 130 may include video images of the user being captured on a media device and shared with other participants during the call, in addition to audio from the user and the other participants.

In the illustrated example, the smart exit controller 118 may provide the user with a contextual transcript to be read out loud. In some cases, the prompt generator 120 of smart exit controller 118 may provide the user a contextual transcript based on a determination that the video feed of the user is inactive. In some examples, the contextual transcript indicates wording that someone other than the user would say (e.g., something a family member, friend, or roommate would say) to the user while the user is on the call (e.g., related to a task, responsibility, or errand to be done by or associated with the user).

In some examples, the audio content controller 124 may provide a user interface for recording audio of the user during the call. The user interface of the audio content controller 124 may include an interface on a screen or display of one or more of the media devices. In some cases, the prompt generator 120 may query the user to determine whether the user would like to capture an audio recording of the user reading the contextual transcript. In some cases, the prompt generator 120 may prompt the user to record the user reading the contextual transcript out loud based on the smart exit controller 118 determining the user is on a conference call 130 and detecting indications that the user would like to exit the call.

In some cases, the prompt generator 120 may prompt the user to record the user reading the contextual transcript out loud based on the smart exit controller 118 confirming that the user would like to exit the call gracefully. Accordingly, the audio content controller 124 may record the user reading the contextual transcript out loud. In some cases, the smart exit controller 118 may be programmed to use names from the user's family, friends, roommates, etc., in the contextual transcript. Accordingly, the smart exit controller 118 may customize and individualize the contextual transcript based on details unique to a particular user.

In the illustrated example, the audio content controller 124 may intercept the audio recording of the user and apply modulation to the audio recording. Additionally, or alternatively, the audio content controller 124 may apply an audio depth effect to the audio recording. The audio content controller 124 (e.g., in conjunction with the mobile media device 102) can initiate to playback the modified recorded audio on a speaker of the mobile media device 102 or cast the modified recorded audio to a speaker that is external to the mobile media device 102 and the computing media device 104.

In the illustrated example, the smart exit controller 118 may enable the user to use pre-recorded audio to exit a call gracefully. When the user's video feed is active (e.g., video images of the user are being captured and shared with other participants on the call), then the other participants might see the user making a recording. Accordingly, when the user's video feed is active, the audio content controller 124 may provide a pre-recorded audio message for exiting the call. In some cases, the audio content controller 124 may pass the pre-recorded audio message through a voice modulation engine of the audio content controller 124. In some cases, the audio content controller 124 may provide a list of two or more pre-recorded audio messages from which the user may choose which pre-recorded audio message to use. In some cases, the audio content controller 124 may allow the user to choose among a list of voice modulations (e.g., lower the pitch of the voice, raise the pitch of the voice, etc.). In some cases, the audio content controller 124 may provide a range of voice modulation (e.g., raise the pitch a first amount, raise the pitch a second amount, lower the pitch a first amount, lower the pitch a second amount, etc.). The audio content controller 124 may display the pre-recorded audio message options on the computing media device 104 and/or the mobile media device 102.

In the illustrated example, the smart exit controller 118 may determine whether the user is sharing his or her screen during the call (e.g., on the display screen of the computing media device 104 where the call is taking place). When the smart exit controller 118 determines that the user is sharing his or her screen, the smart exit controller 118 may block prompts (e.g., from the prompt generator 120) and other user interface elements of the smart exit controller 118 from appearing on the display screen of the computing media device 104. Instead, the smart exit controller 118 may route prompts (e.g., from prompt generator 120) and other user interface elements of the smart exit controller 118 to a display screen of the mobile media device 102.

In the illustrated example, the audio content controller 124 can initiate to playback the modulated pre-recorded audio message on a speaker external to the computing media device 104 on which the call is taking place (e.g., on a speaker of the mobile media device 102, or on a speaker external to the computing media device 104 and the mobile media device 102). In some cases, the prompt generator 120 may prompt the user to turn his or her head in a certain direction (e.g., look left, look right, turn your head left, turn your head right, etc.) in correlation to the modulated pre-recorded audio message being played out loud on the speaker. Accordingly, based on the user's video feed being active, the other participants on the call may see the user turn his or her head while also hearing the modulated pre-recorded audio message played out loud on the speaker.

Figure 2A:
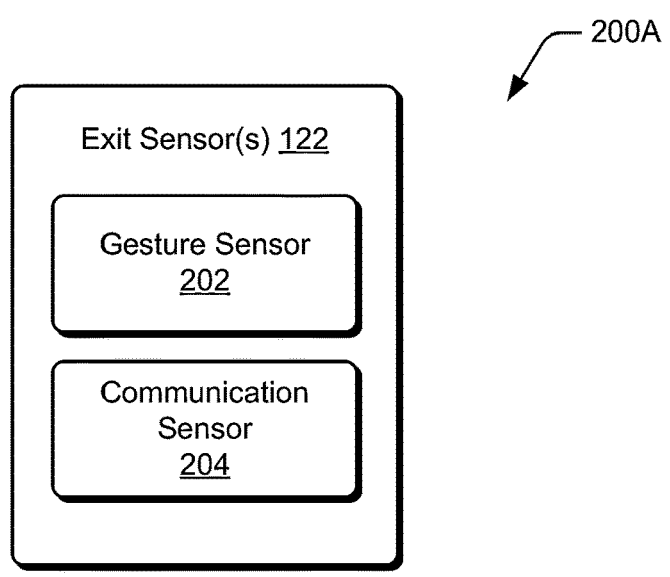
FIGS. 2A and 2B further illustrate examples of modulation-based call exit management in accordance with one or more implementations as described herein.
Figure 2B:
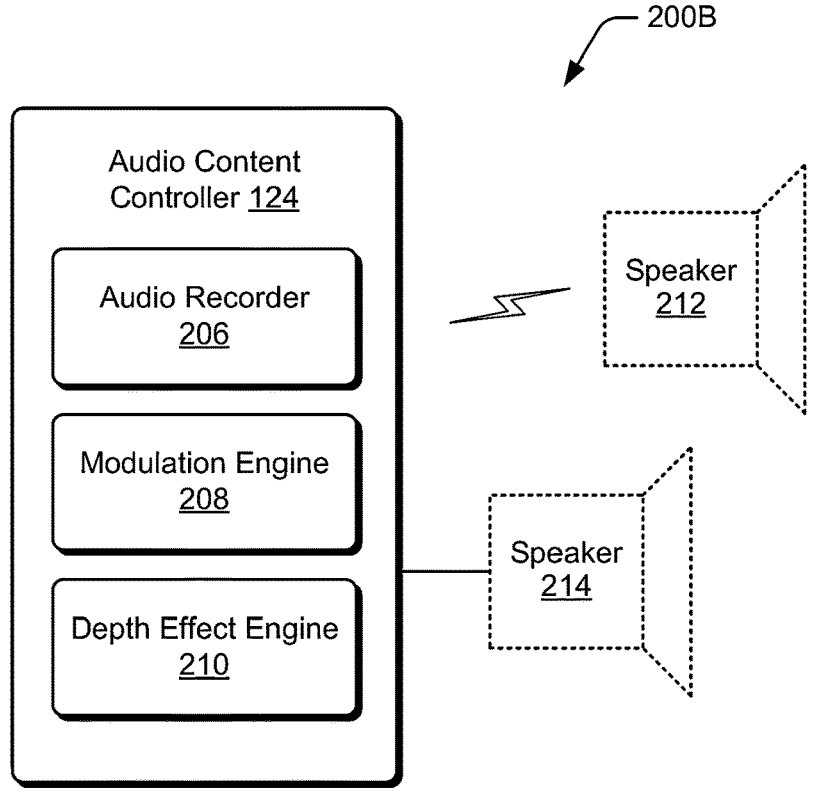

FIGS. 2A and 2B further illustrate examples 200A and 200B of modulation-based call exit management, as described herein. As shown, the one or more exit sensors 122 may include a gesture sensor 202 and a communication sensor 204. In the examples, exit sensors 122 may enable smart call exit functionality associated with detecting indications that the user wishes to exit a call gracefully.

In some examples, the exit sensors 122 may detect indications that the user desires to exit a conference call (e.g., conference call 130) based on visual cues (e.g., gestures of the user), conversational cues (e.g., words or phrases spoken by the user), and/or textual cues (e.g., words or phrases written by the user) detected by exit sensor 122.

In the illustrated example, the gesture sensor 202 may detect visual cues that the user desires to exit a conference call. In some examples, gesture sensor 202 may detect the user checking the time (e.g., checking his or her watch or checking the time on his or her mobile media device 102). In some cases, the gesture sensor 202 may detect the user checking the time at least a threshold number of times within a given time period. In some examples, gesture sensor 202 may detect the user sighing (e.g., sighing at least a threshold number of times within a given time period). In some examples, gesture sensor 202 may detect a facial expression of the user that indicates the user wants to exit the call (e.g., indicates the user is bored or is becoming frustrated or impatient, etc.). In some examples, the gesture sensor 202 may detect that the user is disinterested in the call or is no longer interested in the call (e.g., detect that the user is distracted or no longer paying attention to the call, etc.). In some examples, the gesture sensor 202 may detect that the user is spending more time on his or her phone during the call (e.g., spending at least a threshold time period on his or her phone, etc.).

In the illustrated example, communication sensor 204 may detect conversational cues (e.g., words or phrases spoken by the user) and/or textual cues (e.g., words or phrases written by the user) that indicate the user desires to exit the conference call. In some examples, the communication sensor 204 may determine that the user is disinterested in the call by detecting key phrases communicated by the user during the call. The communication sensor 204 may detect the user speaking and/or writing key phrases during the call (e.g., the user speaks into a microphone of a media device during the call, the user enters text in a chat associated with the call, etc.). The following are some examples of the key phrases, or similar phrases, that the communication sensor 204 may detect the user communicating during the call.

"I've got another call in a couple of minutes. I'll talk to you soon."

"My battery is getting low, so I'm going to hop off. Have an amazing day!"

"It sounds like we've covered everything we needed to, so I'll let you go. Thank you for such a productive meeting!"

"I can't believe it's already [time of day]. I'm sure you've got lots of things on your agenda, so I'll let you get to them. Let me know if there's anything else I can do for you."

"I really appreciate you taking the time to speak with me. Have a fantastic rest of your day, and I'll look for your [email/notes/report/follow-up]."

"Your ideas sound really promising; can't wait to see them in action. In the meantime, you've probably got a lot on your plate, so I'll let you get back to work."

"I want to get you the answers to your questions as soon as possible, so I'm going to get off now—look for my email by the end of the [day/week]."

"Wow, I can't believe it's already [time]. Do you mind if I hang up and finish up my to-do list?"

In the illustrated example, audio content controller 124 includes an audio recorder 206, a modulation engine 208, and a depth effect engine 210. As shown, the audio content controller 124 may connect to a wireless speaker 212 or connect to a wired speaker 214. In some cases, the wired speaker 214 may be a speaker of a mobile wireless device (e.g., a speaker incorporated into the mobile media device 102). In some cases, the wireless speaker 212 may include a speaker wirelessly connected to one or more media devices. In some cases, the audio content controller 124 may transmit a modified audio message to the wireless speaker 212 or to the wired speaker 214.

In some cases, the audio recorder 206 may prompt the user (e.g., via the prompt generator 120) to record the user reading the contextual transcript out loud based on the smart exit controller 118 confirming that the user would like to exit the call gracefully. Accordingly, the audio recorder 206 may record the user reading the contextual transcript out loud.

In the illustrated example, the modulation engine 208 may apply a modulation to the audio recording. In some examples, the smart exit controller 118 may intercept the audio recording of the user from the audio recorder 206. The smart exit controller 118 may then provide the intercepted audio recording to the modulation engine 208. In some cases, the modulation engine 208 may apply modulation to the intercepted audio recording. In some examples, the modulation engine 208 may include multiple modulations. Accordingly, the modulation engine 208 may apply one modulation from the multiple modulations. In some cases, the modulation that is applied may be a user-selected modulation, a default modulation, a modulation randomly selected by the smart exit controller 118, a modulation selected by the smart exit controller 118 (e.g., based on the identity of the user), etc.

In some examples, the depth effect engine 210 may apply an audio depth effect to the audio recording. The audio depth effect applied may be configured to make the audio recording sound as if it is coming from some distance away from the user or from another room when it is played on a speaker (e.g., the wireless speaker 212, or the wired speaker 214).

In implementations, a conference call may occur on a first media device (e.g., the computing media device 104 or the mobile media device 102). Based on the user indicating a desire to exit the call, the first media device or a second media device may confirm that the user wants to exit the call gracefully. The first media device or the second media device may prompt the user (e.g., via prompt generator 120) to record the user speaking a provided contextual transcript on the media device (e.g., "Amit, Naitik has been waiting a long time. Can you please drop him off at badminton?" or "Dinner is ready, and it is getting cold."). The user may accept the request and the smart exit controller 118 or the user may mute the call on the first media device. The user may press a record button on an interface provided by the smart exit controller 118 on the first media device or the second media device. The audio recorder 206 (e.g., of the mobile media device 102) can record the user speaking the contextual transcript out loud. The modulation engine 208 (e.g., of the mobile media device 102) can then modulate the recorded audio. In some cases, modulation engine 208 (e.g., of the mobile media device 102) may apply a depth effect to the recorded audio (e.g., to the modulated recorded audio). The audio content controller 124 (e.g., of the mobile media device 102) may then initiate to playback the modified recorded audio on a speaker of the first media device or the second media device (e.g., the wired speaker 214) or cast the modified recorded audio to a speaker that is external to the first media device and the second media device (e.g., the wireless speaker 212).

When the user's video feed is active on the conference call, the audio content controller 124 may provide a pre-recorded audio message for exiting the call. In some examples, the audio content controller 124 may pass the pre-recorded audio message through modulation engine 208. In some cases, the smart exit controller 118 may provide a list of two or more pre-recorded audio messages from which the user may choose which pre-recorded audio message to use. In some cases, the smart exit controller 118 may allow the user to choose among a list of voice modulations (e.g., lower the pitch of the voice, raise the pitch of the voice, etc.) of the modulation engine 208. In example implementations, the smart exit controller 118 may provide a range of voice modulations (e.g., raise the pitch a first amount, raise the pitch a second amount, lower the pitch a first amount, lower the pitch a second amount, etc.) of the modulation engine 208. The smart exit controller 118 may display the pre-recorded audio message options on the first media device and/or the second media device. The smart exit controller 118 may provide the modulation selected by the user to the audio content controller 124. Accordingly, the modulation engine 208 can apply the selected modulation to the pre-recorded audio message and the depth effect engine 210 can apply the depth effect. The audio content controller 124 can then output the modified pre-recorded audio message to a speaker (e.g., the wireless speaker 212 or the wired speaker 214).

Example methods 300, 400, and 500 are described with reference to respective FIGS. 3, 4, and 5 in accordance with one or more implementations of modulation-based call exit management, as described herein. Generally, any services, components, modules, managers, controllers, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 3:
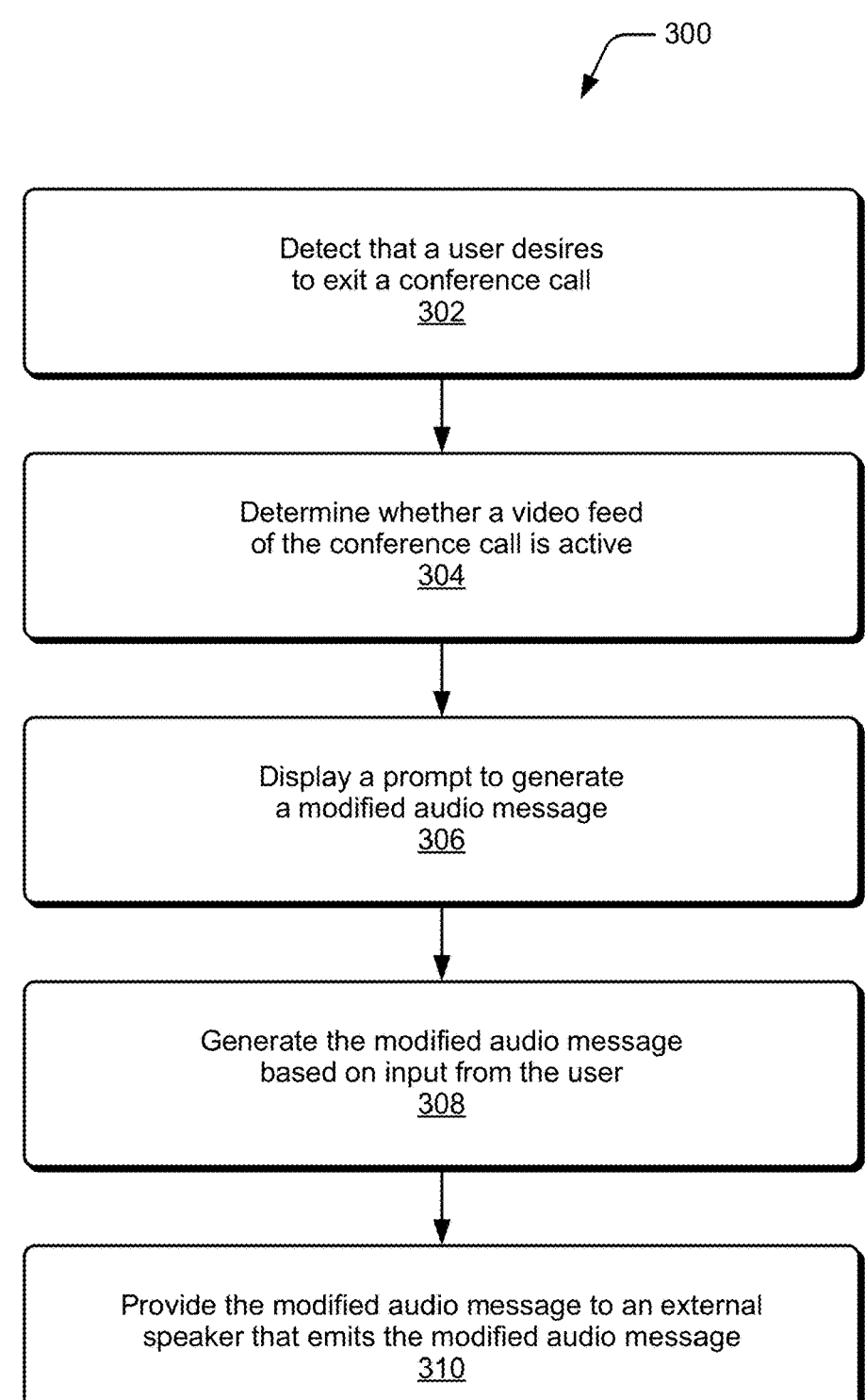
FIGS. 3-5 illustrate example methods for modulation-based call exit management in accordance with one or more implementations of the techniques described herein.

FIG. 3 illustrates example method(s) 300 for modulation-based call exit management. The order in which the method is described is not intended to be construed as a limitation, and any number or combination of the described method operations may be performed in any order to perform a method, or an alternate method.

At 302, the method 300 includes detecting that a user desires to exit a conference call (e.g., via one or more sensors, one or more exit sensors 122, etc.). For example, the exit sensors 122 detect one or more visual cues (e.g., gestures of the user during the call), conversational cues (e.g., words or phrases spoken by the user during the call), and/or textual cues (e.g., words written or texted by the user during the call).

At 304, the method 300 includes determining whether a video feed of the conference call is active. For example, the smart exit controller 118 determines whether a conference call on a device (e.g., the mobile media device 102, the computing media device 104, etc.) includes video of the user being captured and communicated to other participants on the conference call.

At 306, the method 300 includes displaying a prompt to generate a modified audio message via the media device. For example, the prompt generator 120 prompts the user to generate a modulated version of a recorded audio message. The recorded audio message may be pre-recorded or may be recorded during the call.

At 308, the method 300 includes generating the modified audio message based on input from the user. For example, the smart exit controller 118 receives an input from the user that confirms the user wishes the exit the conference call (e.g., the user presses an interface button in response to the prompt at 306). Additionally, or alternatively, the smart exit controller 118 receives an input from the user that includes a recording of the user reading a contextual transcript provided by the prompt generator 120.

At 310, the method 300 includes providing the modified audio message to an external speaker that emits the modified audio message. For example, the audio content controller 124 modifies (e.g., modulate and/or apply a depth effect) an audio message and initiates to playback the modified audio message on a speaker. The audio message may include a pre-recorded audio message captured before the conference call or a recorded audio message captured during the conference call.

Figure 4:
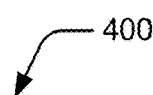

FIG. 4 illustrates example method(s) 400 for modulation-based call exit management. The order in which the method is described is not intended to be construed as a limitation, and any number or combination of the described method operations may be performed in any order to perform a method, or an alternate method.

At 402, the method 400 includes determining a user is on an audio conference call (e.g., conference call with active audio and video is turned off). For example, the smart exit controller 118 monitors one or more media devices (e.g., the mobile media device 102, the computing media device 104, etc.). Based on the monitoring, the smart exit controller 118 determines the user is on an audio call (e.g., on a call with audio and no video, an audio-only call).

In example implementations, the smart exit controller 118 determines that the user is on a call and determines whether the call is an audio call or an audio/video call. In some examples, the smart exit controller 118 may determine that the user is on an audio call (e.g., determine a video feed option of the call is disabled or deactivated). In some cases, the smart exit controller 118 determines that the user requests to record audio. Based on the request to record audio, the smart exit controller 118 determines whether the user is on a call (e.g., at 402). When the user requests to record audio and the smart exit controller 118 determines the user is not on a call, then the smart exit controller 118 may open an audio recorder application (e.g., open a simple audio recorder without modulation, without depth effect, etc.). In some examples, the smart exit controller 118 may determine that the user has requested to record audio while on a call (e.g., at 402). In response, the smart exit controller 118 provides the prompt with the contextual transcript (e.g., via the prompt generator 120). However, when the user rejects the prompt with the contextual transcript, in some cases, the smart exit controller 118 may open an audio recorder application based on the user requesting to record audio.

At 404, the method 400 includes determining the user wants to exit gracefully from the conference call. For example, the smart exit controller 118 determines (e.g., via gesture sensor 202 and/or communication sensor 204) that the user is exhibiting detectable signs (e.g., gestures, visual cues, conversational cues, textual cues, etc.) that indicate the user desires to exit the audio call.

In example implementations, the smart exit controller 118 determines that the user wants to exit a call gracefully based on detected indications (e.g., detected gestures of the user, via detected communication of the user, etc.). In some cases, the smart exit controller 118 displays a prompt to the user inquiring whether the user would like to exit the call gracefully (e.g., based on the detected indications). In some cases, the prompt inquiring whether the user would like to exit the call can be triggered by the smart exit controller 118 detecting one or more indications that the user would like to exit the call (e.g., via detected gestures, via detected communication, via the user requesting to record audio while on a call, etc.). When the user indicates there is no desire to exit the call (e.g., clicks on a "NO" button of a user interface, etc.), the smart exit controller 118 can open an audio recorder application (e.g., based on the user requesting to record audio). In some cases, detecting that the user wants to exit a call may include the smart exit controller 118 determining, via a user interface incorporated in at least one of the computing device or the mobile wireless device (e.g., the prompt generator 120), a selection by the user that indicates the user desires the end the call.

At 406, the method 400 includes prompting the user to accept a contextual transcript for exiting the conference call gracefully. For example, the prompt generator 120 may provide a prompt that requests the user accept the contextual transcript. Based on the user accepting the request, the smart exit controller 118 may execute the techniques for modulation-based call exit management.

At 408, the method 400 includes recording the user reading the contextual transcript out loud. For example, the smart exit controller 118 implements the audio recorder 206 to record the user reading the contextual transcript out loud.

At 410, the method 400 includes applying voice modulation and depth effect to the recorded audio. For example, the audio recorder 206 provides the recorded audio to the modulation engine 208 and the modulation engine 208 applies modulation to the recorded audio to generate modulated audio. The modulation engine 208 may provide the modulated audio to the depth effect engine 210 and the depth effect engine 210 applies a depth effect to the modulated audio to generate depth-enhanced modulated audio. The audio content controller 124 then provides the depth-enhanced modulated audio to a speaker that is external to at least one media device (e.g., external to the media device hosting the conference call).

Figure 5:
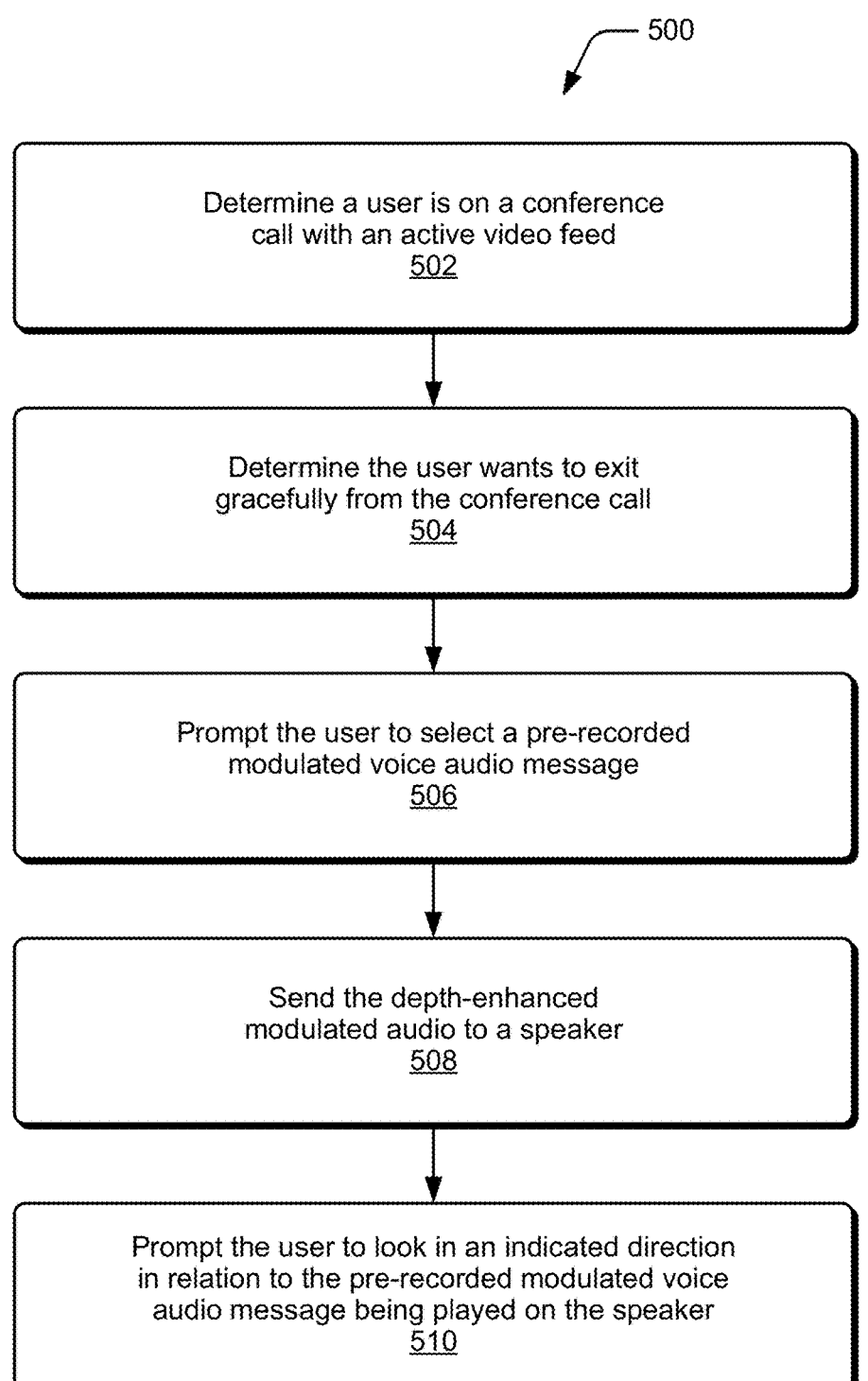

FIG. 5 illustrates example method(s) 500 for modulation-based call exit management. The order in which the method is described is not intended to be construed as a limitation, and any number or combination of the described method operations may be performed in any order to perform a method, or an alternate method.

At 502, the method 500 includes determining a user is on a call with an active video feed. For example, the smart exit controller 118 determines the user is on a conference call that includes audio and video of the user (e.g., the user is sharing audio and video with participants on the conference call). In some cases, the smart exit controller 118 can query the conference call application and determine that the conference call is unmuted for the user and that the video camera is active and capturing video images of the user during the call.

At 504, the method 500 includes determining the user wants to exit gracefully from the call. For example, the smart exit controller 118 may determine (e.g., via the gesture sensor 202 and/or the communication sensor 204) that the user is exhibiting detectable signs (e.g., gestures, visual cues, conversational cues, textual cues, etc.) that indicate the user desires to exit the audio call. In some cases, the user may interact with an interface associated with the smart exit controller 118 to indicate that the user desires to exit the call gracefully. For example, the user may open an interface of the smart exit controller 118 (e.g., on the mobile media device 102) and select an option or click on an interface button that indicates the user desires to exit the conference call gracefully.

In some cases, the smart exit controller 118 may prompt the user (e.g., via the prompt generator 120) with a request of whether the user desires to exit the call gracefully (e.g., to confirm that the user desires to exit the call based on the gesture sensor 202 detecting gestures of the user that suggest the user desires to exit the call). In some cases, detecting that the user wants to exit a call may include the smart exit controller 118 determining, via a user interface of at least one of the computing device or the mobile wireless device (e.g., by the prompt generator 120), a selection by the user that indicates the user desires the end the call.

At 506, the method 500 includes prompting the user to select a pre-recorded audio message. For example, the prompt generator 120 generates a prompt that includes one or more available pre-recorded audio messages and initiates to display the prompt on a display screen of at least one media device (e.g., on a display screen of the media device hosting the conference call and/or a media device not hosting the conference call). In some examples, the audio content controller 124 may provide the selected pre-re-corded audio to the modulation engine 208 and the modulation engine 208 applies modulation to the pre-recorded audio to generate modulated audio. The modulation engine 208 may provide the modulated audio to the depth effect engine 210 and the depth effect engine 210 applies a depth effect to the modulated audio to generate depth-enhanced modulated audio.

In some examples, the prompt generator 120 displays a prompt that includes one or more pre-recorded audio messages. In some cases, the prompt may include a title of a single pre-recorded audio message with an interface for (e.g., a user interface button for playing the pre-recorded audio message). In some cases, the smart exit controller 118 displays a prompt that includes a list of pre-recorded audio messages. When the prompt includes the list, the prompt may request that the user select one of the pre-recorded audio messages from the list. In some cases, the smart exit controller 118 may prompt the user to send the selected pre-recorded audio message based on the user selecting the pre-recorded audio message from the list.

At 508, the method 500 includes sending the depth-enhanced modulated audio to a speaker. For example, the audio content controller 124 provides the depth-enhanced modulated audio to a speaker that is external to at least one media device (e.g., the wireless speaker 212 or the wired speaker 214).

At 510, the method 500 includes prompting the user to look in an indicated direction in relation to the pre-recorded modulated voice audio message being played on the speaker. For example, the prompt generator 120 may prompt the user to look in an indicated direction (e.g., look left, look right, turn head to the left, turn head to the right, etc.) in relation to the pre-recorded modulated voice audio message being played on the speaker. In some cases, the prompt may be displayed in relation to (e.g., before, after, as) the pre-recorded modulated voice audio message is played back on the speaker (e.g., within one second of the pre-recorded modulated voice audio message being played on the speaker).

Figure 6:
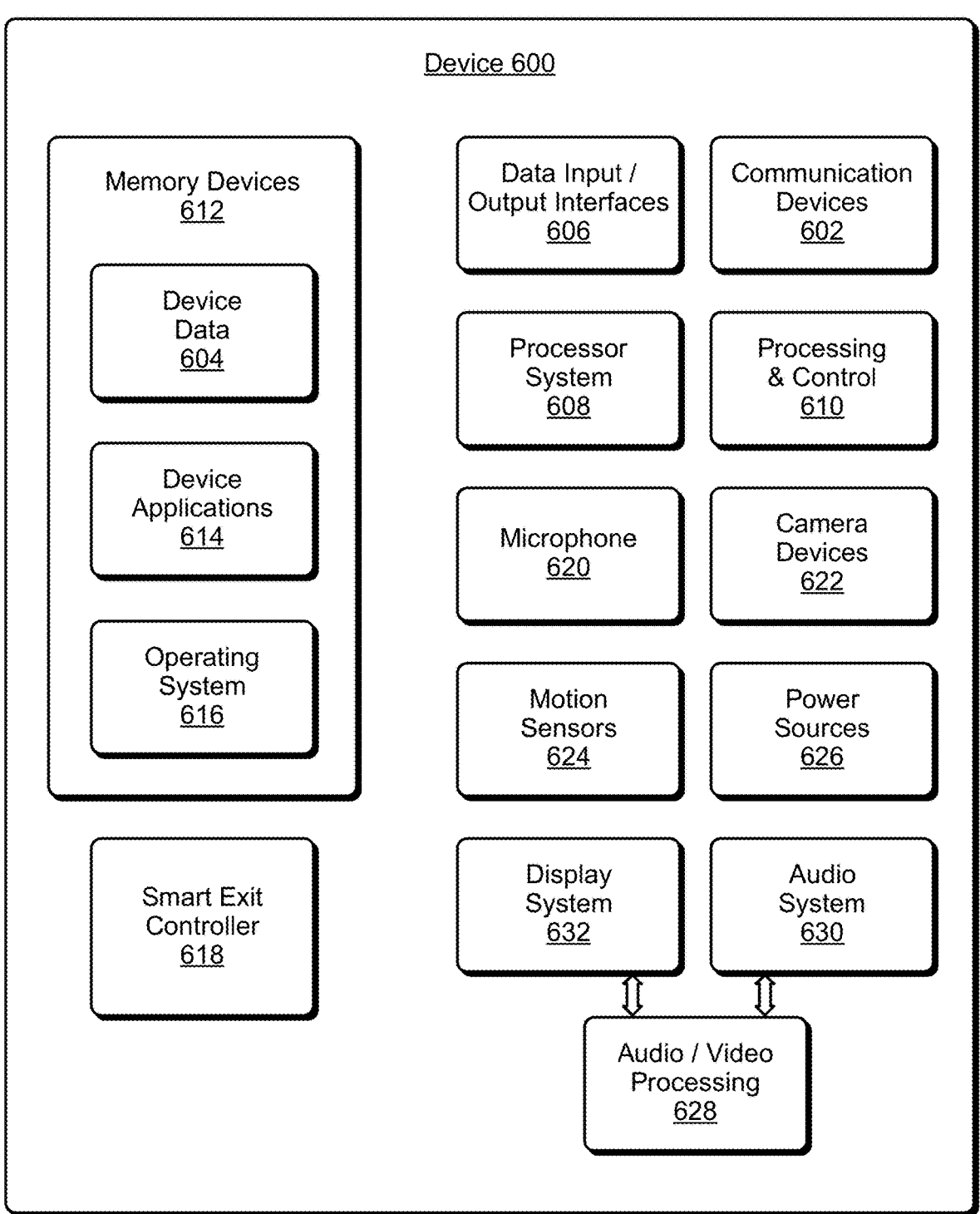
FIG. 6 illustrates various components of an example device that may be used to implement the techniques for modulation-based call exit management as described herein.

FIG. 6 illustrates various components of an example device 600, which can implement aspects of the techniques and features for modulation-based call exit management, as described herein. The example device 600 may be implemented as any of the devices described with reference to the previous FIGS. 1-5, such as any type of a wireless device, mobile device, mobile phone, flip phone, client device, companion device, paired device, display device, tablet, computing, communication, entertainment, gaming, media playback, and/or any other type of computing and/or electronic device. For example, the mobile media device 102 and/or the computing media device 104 described with reference to FIGS. 1-5 may be implemented as the example device 600.

The example device 600 can include various, different communication devices 602 that enable wired and/or wireless communication of device data 604 with other devices. The device data 604 can include any of the various devices data and content that is generated, processed, determined, received, stored, and/or communicated from one computing device to another. Generally, the device data 604 can include any form of audio, video, image, graphics, and/or electronic data that is generated by applications executing on a device. The communication devices 602 can also include transceivers for cellular phone communication and/or for any type of network data communication.

The example device 600 can also include various, different types of data input/output (I/O) interfaces 606, such as data network interfaces that provide connection and/or communication links between the devices, data networks, and other devices. The I/O interfaces 606 may be used to couple the device to any type of components, peripherals, and/or accessory devices, such as a computer input device that may be integrated with the example device 600. The I/O interfaces 606 may also include data input ports via which any type of data, information, media content, communications, messages, and/or inputs may be received, such as user inputs to the device, as well as any type of audio, video, image, graphics, and/or electronic data received from any content and/or data source.

The example device 600 includes a processor system 608 of one or more processors (e.g., any of microprocessors, controllers, and the like) and/or a processor and memory system implemented as a system-on-chip (SoC) that processes computer-executable instructions. The processor system 608 may be implemented at least partially in computer hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively, or in addition, the device may be implemented with any one or combination of software, hardware, firmware, or fixed logic circuitry that may be implemented in connection with processing and control circuits, which are generally identified at 610. The example device 600 may also include any type of a system bus or other data and command transfer system that couples the various components within the device. A system bus can include any one or combination of different bus structures and architectures, as well as control and data lines.

The example device 600 also includes memory and/or memory devices 612 (e.g., computer-readable storage memory) that enable data storage, such as data storage devices implemented in hardware which may be accessed by a computing device, and that provide persistent storage of data and executable instructions (e.g., software applications, programs, functions, and the like). Examples of the memory devices 612 include volatile memory and non-volatile memory, fixed and removable media devices, and any suitable memory device or electronic data storage that maintains data for computing device access. The memory devices 612 can include various implementations of random-access memory (RAM), read-only memory (ROM), flash memory, and other types of storage media in various memory device configurations. The example device 600 may also include a mass storage media device.

The memory devices 612 (e.g., as computer-readable storage memory) provide data storage mechanisms, such as to store the device data 604, other types of information and/or electronic data, and various device applications 614 (e.g., software applications and/or modules). For example, an operating system 616 may be maintained as software instructions with a memory device 612 and executed by the processor system 608 as a software application. The device applications 614 may also include a device manager, such as any form of a control application, software application, signal-processing and control module, code that is specific to a particular device, a hardware abstraction layer for a particular device, and so on.

In this example, the device 600 includes a smart exit controller 618 that implements various aspects of the described features and techniques described herein. The smart exit controller 618 may be implemented with hardware components and/or in software as one of the device applications 614, such as when the example device 600 is implemented as the mobile media device 102 and/or the computing media device 104 described with reference to FIGS. 1-5. An example of the smart exit controller 618 is the smart exit controller 118 implemented by the mobile media device 102 and/or the computing media device 104, such as a software application and/or as hardware components in the wireless device and/or in the computing device. In implementations, the smart exit controller 618 may include independent processing, memory, and logic components as a computing and/or electronic device integrated with the example device 600.

The example device 600 can also include a microphone 620 (e.g., to capture an audio recording of a user) and/or camera devices 622 (e.g., to capture video images of the user during a call), as well as motion sensors 624, such as may be implemented as components of an inertial measurement unit (IMU). The motion sensors 624 may be implemented with various sensors, such as a gyroscope, an accelerometer, and/or other types of motion sensors to sense motion of the device. The motion sensors 624 can generate sensor data vectors having three-dimensional parameters (e.g., rotational vectors in x, y, and z-axis coordinates) indicating location, position, acceleration, rotational speed, and/or orientation of the device. The example device 600 can also include one or more power sources 626, such as when the device is implemented as a wireless device and/or mobile device. The power sources may include a charging and/or power system, and may be implemented as a flexible strip battery, a rechargeable battery, a charged super-capacitor, and/or any other type of active or passive power source.

The example device 600 can also include an audio and/or video processing system 628 that generates audio data for an audio system 630 and/or generates display data for a display system 632. The audio system and/or the display system may include any types of devices or modules that generate, process, display, and/or otherwise render audio, video, display, and/or image data. Display data and audio signals may be communicated to an audio component and/or to a display component via any type of audio and/or video connection or data link. In implementations, the audio system and/or the display system are integrated components of the example device 600. Alternatively, the audio system and/or the display system are external, peripheral components to the example device.

Although implementations for modulation-based call exit management have been described in language specific to features and/or methods, the appended claims are not necessarily limited to the specific features or methods described. Rather, the specific features and methods are disclosed as example implementations for modulation-based call exit management, and other equivalent features and methods are intended to be within the scope of the appended claims. Further, various different examples are described, and it is to be appreciated that each described example may be implemented independently or in connection with one or more other described examples. Additional aspects of the techniques, features, and/or methods discussed herein relate to one or more of the following:

A method comprising: detecting that a user desires to exit a conference call; determining that a video feed of the conference call is active; displaying a prompt to generate a modified audio message; generating the modified audio message based on input from the user; and providing the modified audio message to an external speaker that emits the modified audio message.

Alternatively, or in addition to the above-described method, any one or combination of: the detecting includes detecting a gesture of the user that indicates the user desires to exit the conference call. The detecting includes detecting a comment communicated by the user during the conference call that indicates the user desires to exit the conference call. The video feed being active includes a camera of a computing device capturing video images of the user. Generating the modified audio message includes selecting a pre-recorded audio message; and applying at least one of modulation or a depth effect to the pre-recorded audio message. The pre-recorded audio message is a recording of the user reading a contextual transcript before the conference call. The method further comprising displaying the prompt on a media device instructing the user to look in an indicated direction.

A method comprising: detecting that a user desires to exit a conference call; determining that a video feed of the conference call is inactive; displaying a prompt to generate a modified audio message; generating the modified audio message based on input from the user; and providing the modified audio message to an external speaker that emits the modified audio message.

Alternatively, or in addition to the above-described mobile wireless device, any one or combination of: the detecting includes detecting a gesture of the user that indicates the user desires to exit the conference call. The detecting includes detecting a comment communicated by the user during the conference call that indicates the user desires to exit the conference call. The method further comprising displaying a contextual transcript on a screen; and recording an audio message of the user reading the contextual transcript during the conference call. The method further comprising generating the modified audio message based on applying at least one of modulation to the audio message of the user; or a depth effect to the audio message of the user. The method further comprising muting the conference call; and recording the audio message of the user while the conference call is muted.

A media device, comprising: a memory to maintain a contextual transcript and a pre-recorded audio message; and a processor coupled with the memory, the processor configured to cause the media device to: detect that a user desires to exit a conference call; determine whether a video feed of the conference call is active or inactive, and one of: based on the video feed being active: apply at least one of modulation or a depth effect to the pre-recorded audio message to generate a modified pre-recorded audio message; and provide the modified pre-recorded audio message to a speaker that emits the modified pre-recorded audio message; or based on the video feed being inactive: record an audio message of the user reading the contextual transcript during the conference call to generate a recorded audio message; apply at least one of the modulation or the depth effect to the recorded audio message to generate a modified recorded audio message; and provide the modified recorded audio message to a speaker that emits the modified recorded audio message.

Alternatively, or in addition to the above-described media device, any one or combination of: the processor further causes the media device to detect a gesture of the user that indicates the user desires to exit the conference call. The processor further causes the media device to detect a comment communicated by the user during the conference call that indicates the user desires to exit the conference call. Based on the video feed being active, the processor further causes the media device to display a prompt on at least one of the media device or a computing device that instructs the user to look in an indicated direction in relation to the modified pre-recorded audio message being emitted by the speaker. The video feed being active includes a camera of a computing device configured to capture video images of the user. Based on the video feed being inactive, the processor further causes the media device to display a contextual transcript on a display screen of the media device. Based on the video feed being inactive, the processor further causes the media device to mute the conference call; and record the audio message of the user while the conference call is muted.

The invention claimed is:

1. A method, comprising:
maintaining a contextual transcript and a pre-recorded audio message;
detecting that a user desires to exit a conference call;
determining that a video feed of the conference call is active or inactive, and one of:
based on the video feed of the conference call being active;
displaying a prompt to generate a modified pre-recorded audio message;
generating the modified pre-recorded audio message by applying at least one of modulation or a depth effect to the pre-recorded audio message to sound like someone other than the user; and
providing the modified pre-recorded audio message to an external speaker that emits the modified pre-recorded audio message; or
based on the video feed of the conference call being inactive:
recording an audio message of the user reading the contextual transcript during the conference call to generate a recorded audio message;
applying at least one of the modulation or the depth effect to the recorded audio message to generate a modified recorded audio message; and
providing the modified recorded audio message to the external speaker that emits the modified recorded audio message.

2. The method of claim 1, wherein the detecting includes detecting a gesture of the user that indicates the user desires to exit the conference call.

3. The method of claim 1, wherein the detecting includes detecting a comment communicated by the user during the conference call that indicates the user desires to exit the conference call.

4. The method of claim 1, wherein the video feed being active includes a camera of a computing device capturing video images of the user.

5. The method of claim 1, wherein generating the modified pre-recorded audio message includes selecting the pre-recorded audio message and at least one of the modulation or the depth effect applied to the pre-recorded audio message.

6. The method of claim 5, wherein the pre-recorded audio message is a recording of the user reading the contextual transcript before the conference call.

7. The method of claim 1, further comprising:
displaying the prompt on a media device instructing the user to look in an indicated direction.

8. A system, comprising:
a memory to maintain a contextual transcript and a pre-recorded audio message; and
a processor coupled with the memory, the processor configured to cause the system to:
detect that a user desires to exit a conference call;
determine that a video feed of the conference call is active or inactive, and one of:
based on the video feed of the conference call being active:
apply at least one of modulation or a depth effect to the pre-recorded audio message to generate a modified pre-recorded audio message; and
provide the modified pre-recorded audio message to an external speaker that emits the modified pre-recorded audio message; or
based on the video feed of the conference call being inactive:
display a prompt to generate a recorded audio message;
generate the recorded audio message by recording an audio message of the user reading the contextual transcript during the conference call;
apply at least one of the modulation or the depth effect to the recorded audio message to generate a modified recorded audio message that sounds like someone other than the user; and
provide the modified recorded audio message to the external speaker that emits the modified recorded audio message.

9. The method system of claim 8, wherein the system is configured to detect a gesture of the user that indicates the user desires to exit the conference call.

10. The system of claim 8, wherein the system is configured to detect a comment communicated by the user during the conference call that indicates the user desires to exit the conference call.

11. The system of claim 8, wherein the system is configured to display the contextual transcript on a screen.

12. The system of claim 11, wherein the system is configured to:
mute the conference call; and
record the audio message of the user while the conference call is muted.

13. A media device, comprising:

a memory to maintain a contextual transcript and a pre-recorded audio message; and a processor coupled with the memory, the processor configured to cause the media device to:

detect that a user desires to exit a conference call;

determine whether a video feed of the conference call is active or inactive, and one of:

based on the video feed being active:

apply at least one of modulation or a depth effect to the pre-recorded audio message to generate a modified pre-recorded audio message; and provide the modified pre-recorded audio message to a speaker that emits the modified pre-recorded audio message; or based on the video feed being inactive:

record an audio message of the user reading the contextual transcript during the conference call to generate a recorded audio message;

apply at least one of the modulation or the depth effect to the recorded audio message to generate a modified recorded audio message; and provide the modified recorded audio message to the speaker that emits the modified recorded audio message.

14. The media device of claim 13, wherein the processor further causes the media device to detect a gesture of the user that indicates the user desires to exit the conference call.

15. The media device of claim 13, wherein the processor further causes the media device to detect a comment communicated by the user during the conference call that indicates the user desires to exit the conference call.

16. The media device of claim 13, based on the video feed being active, the processor further causes the media device to display a prompt on at least one of the media device or a computing device that instructs the user to look in an indicated direction in relation to the modified pre-recorded audio message being emitted by the speaker.

17. The media device of claim 13, wherein the video feed being active includes a camera of a computing device configured to capture video images of the user.

18. The media device of claim 13, wherein based on the video feed being inactive, the processor further causes the media device to display the contextual transcript on a display screen of the media device.

19. The media device of claim 13, wherein based on the video feed being inactive, the processor further causes the media device to:

mute the conference call; and record the audio message of the user while the conference call is muted.

20. The method of claim 1, further comprising:

displaying an additional prompt on a media device instructing the user to look in an indicated direction of the modified pre-recorded audio message being emitted by the external speaker.

* * * * *